(12) United States Patent
Liu

(10) Patent No.: US 8,133,028 B2
(45) Date of Patent: Mar. 13, 2012

(54) COOLING FAN STRUCTURE

(75) Inventor: Ching-Wen Liu, Taichung Hsien (TW)

(73) Assignee: Pan Air Electric Co., Ltd. (TW)

( * ) Notice: Subject to any disclaimer, the term of this patent is extended or adjusted under 35 U.S.C. 154(b) by 682 days.

(21) Appl. No.: 12/254,804

(22) Filed: Oct. 20, 2008

(65) Prior Publication Data

US 2010/0098545 A1    Apr. 22, 2010

(51) Int. Cl.
*F04D 29/00* (2006.01)
*F04D 25/08* (2006.01)

(52) U.S. Cl. ............. 416/204 R; 416/210 R; 416/223 R

(58) Field of Classification Search .................. None
See application file for complete search history.

(56) References Cited

U.S. PATENT DOCUMENTS

| 6,309,083 | B1 * | 10/2001 | Lathrop et al. | 362/96 |
| 2007/0104583 | A1 * | 5/2007 | Gajewski | 416/210 R |

* cited by examiner

*Primary Examiner* — Scott B Geyer

(57) ABSTRACT

A cooling fan structure includes a driving device having a rotatable section disposed therein for providing a rotatable effect. The rotatable section has a first end longitudinally extending to a top of the driving device and a second end longitudinally extending to a bottom of the driving device. A set of fan blades is radially mounted to the rotatable section of the driving device and driven by the rotatable section. Each fan blade has an inner end. The inner end has a first connection and a second connection respectively extending therefrom. The first connection of each fan blade is connected to the first end of the rotatable section. The second connection of each fan blade is connected to the second end of the rotatable section.

4 Claims, 9 Drawing Sheets

COOLING FAN STRUCTURE

BACKGROUND OF THE INVENTION

1. Field of the Invention

The present invention relates to a cooling fan, and more particularly to a cooling fan structure for stably connected to each fan blade.

2. Description of Related Art

A conventional cooling fan has been used for years in circulating air. The conventional cooling fan typically has a motor within a housing mounted to a central rod. A set of fan blades is radially connected to the central rod. The central rod rotates the set of the fan blades about an axis of the central rod. The fan blades traditionally are flat and oriented at an incline or pitch to a specifically angle for causing air mass to be downwardly driven.

However, a connection between each fan blade of the conventional cooling fan and the central rod is a one-to-one. The set of fan blades receives a vibration caused by air resistance when the set of fan blades is rotated by the central rod driven by the motor. After a long time using, the one-to-one connection will easily loose due to the vibration of the set of fan blades. The connection will fatigue and embrittle due to long time vibration of the set of fan blades such that the connection will be easily broken.

The present invention has arisen to mitigate and/or obviate the disadvantages of the conventional cooling fan.

SUMMARY OF THE INVENTION

The main objective of the present invention is to provide an improved cooling fan structure that has a two connections extending therefrom for respectively mounted with two ends of a rotatable section.

To achieve the objective, the cooling fan structure in accordance with the present invention comprises a driving device having a rotatable section disposed therein for providing a rotatable effect. The rotatable section has a first end longitudinally extending to a top of the driving device and a second end longitudinally extending to a bottom of the driving device. A set of fan blades is radially mounted with the rotatable section of the driving device and driven by the rotatable section. Each fan blade has an inner end. The inner end has a first connection and a second connection respectively extending therefrom. The first connection of each fan blade is connected to the first end of the rotatable section. The second connection of each fan blade is connected to the second end of the rotatable section.

Each fan blade inclines to a specific angle relative to the first connection and the second connection for causing air mass to be downwardly driven when the set of fan blades is rotatably driven by the rotatable section. Each fan blade is stably and simultaneously screwed on the first end and the second end of the rotatable section for firmly connecting to the rotatable section of the driving device. The first connection and the second connection are cooperatively taken air friction and decrease a vibration caused by air resistance.

Further benefits and advantages of the present invention will become apparent after a careful reading of the detailed description with appropriate reference to the accompanying drawings.

DETAILED DESCRIPTION OF THE INVENTION

Figure 1:
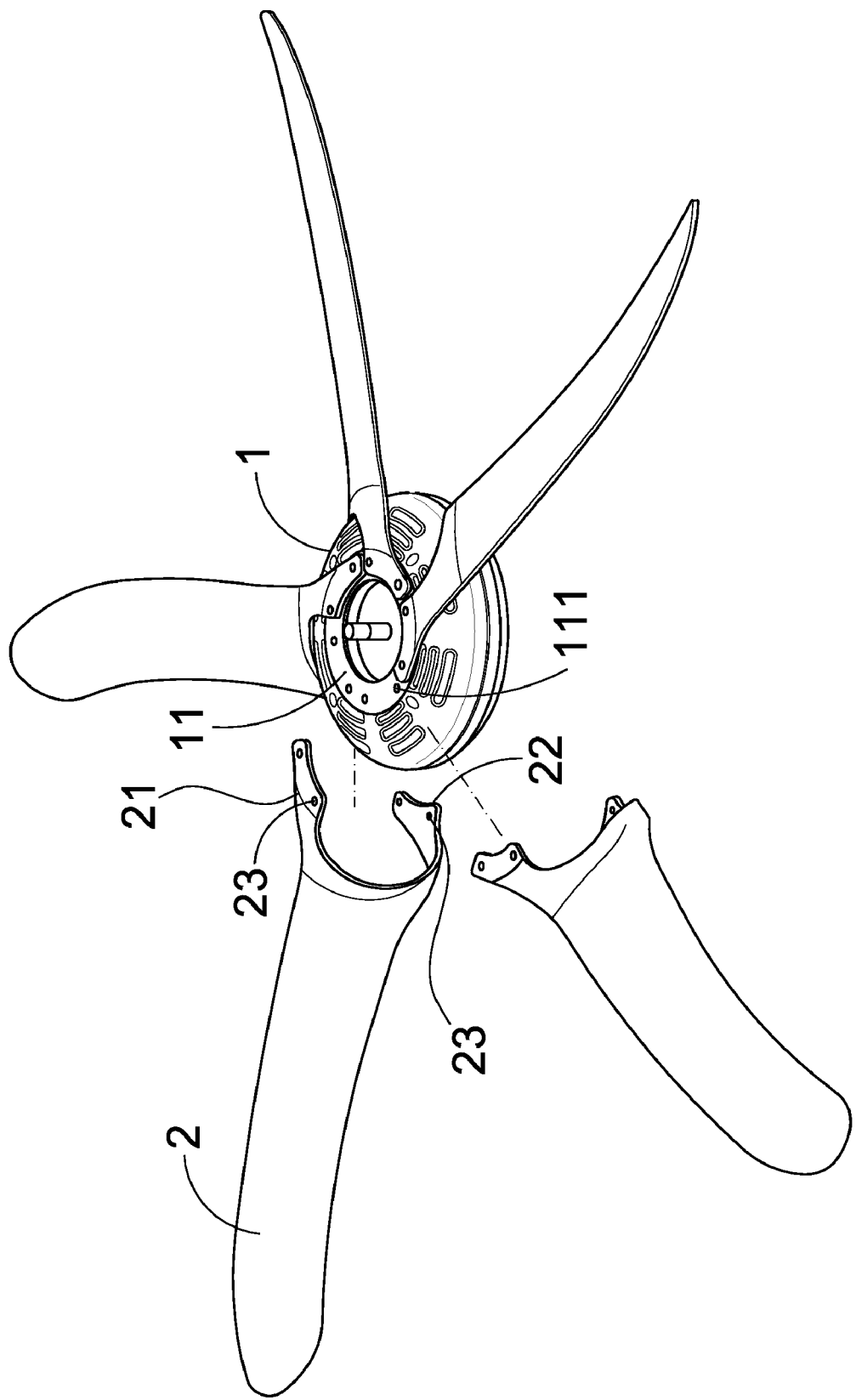
FIG. 1 is an exploded perspective view of a first embodiment of a cooling fan structure in accordance with the present invention.
Figure 2:
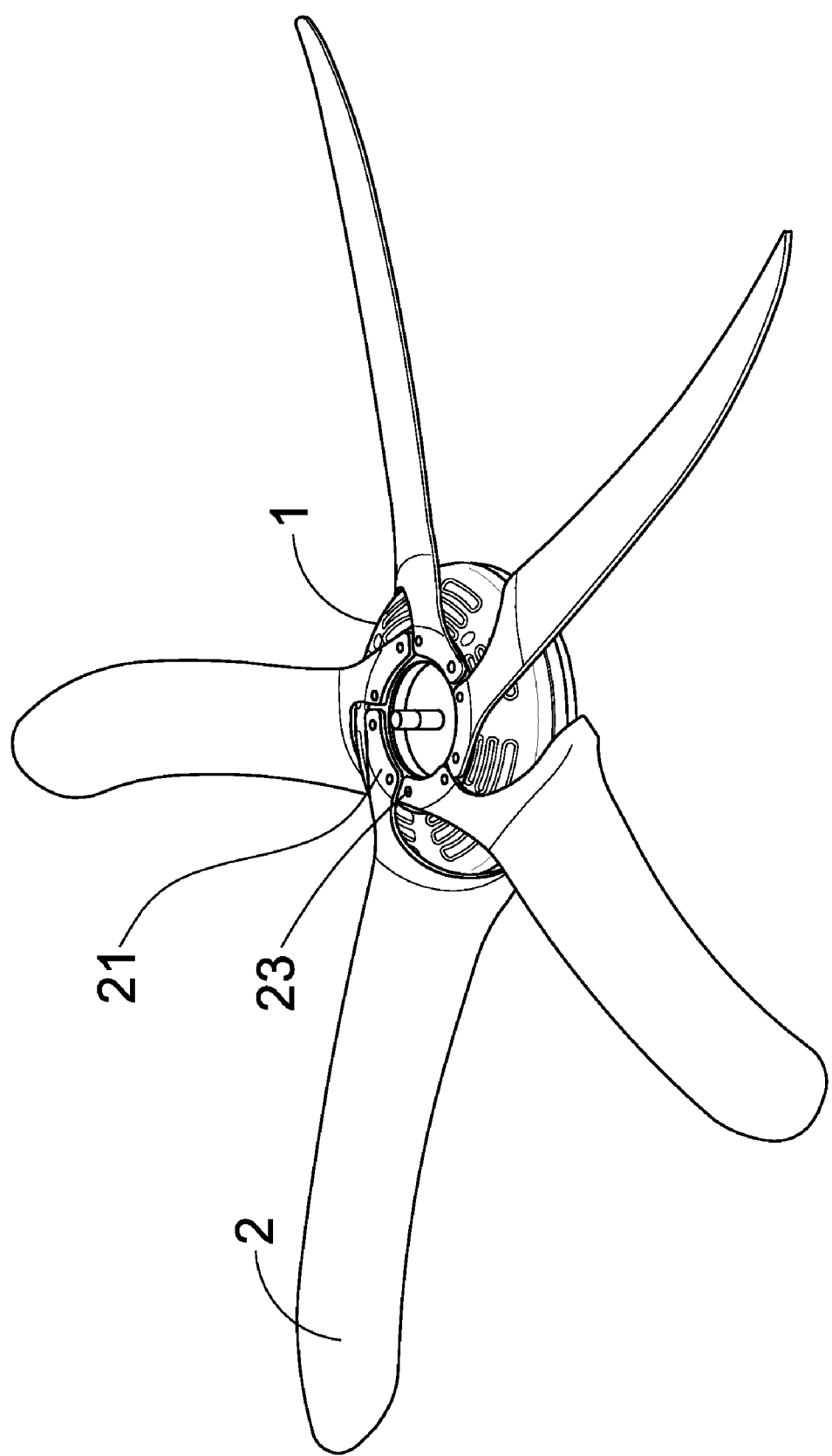
FIG. 2 is an assembled perspective view of the first embodiment of the cooling fan structure in accordance with the present invention.
Figure 3:
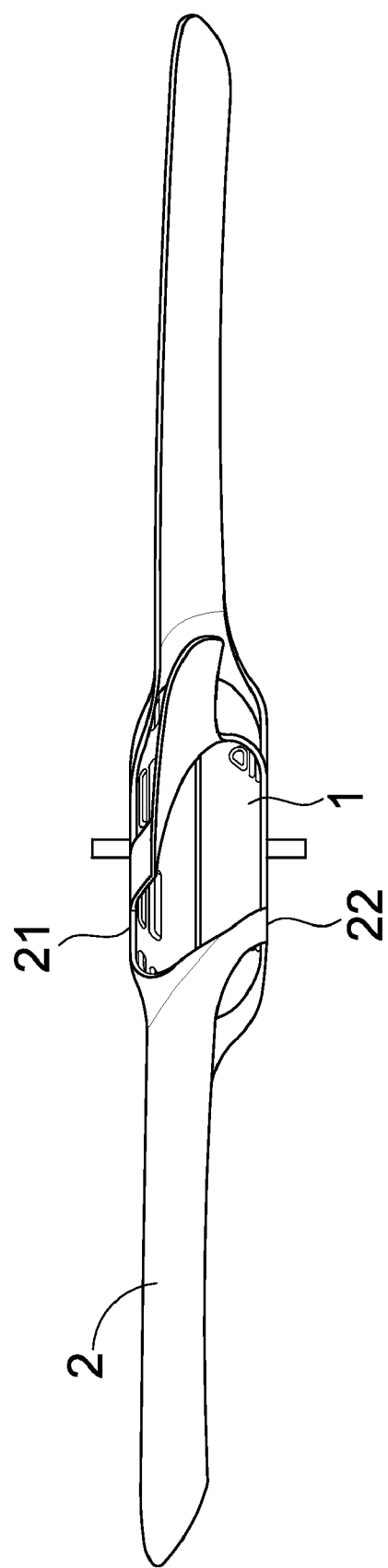
FIG. 3 is a side plan view in FIG. 2.

Referring to the drawings and initially to FIGS. 1-3, a cooling fan structure in accordance with the present invention comprises a driving device (1) and a set of fan blades (2) concentrically and radially mounted thereon.

The driving device (1) has a rotatable section (11) centrally and co-axially disposed therein for providing a rotatable effect and driving the set of fan blades (2). The rotatable section (11) has a first end longitudinally extending to a top of the driving device (1) and a second end longitudinally extending to a bottom of the driving device (1). The rotatable section (11) has multiple holes (111) respectively defined in the first end and the second end thereof.

The set of fan blades (2) is concentrically mounted with the rotatable section (11). Each fan blade (2) is fin shaped and has an inner end for connecting to the driving device (1). The inner end of each fan blade (2) has a first connection (21) and a second connection (22) respectively extending therefrom. The first connection (21) and the second connection (22) are noncoplanar. The first connection (21) and the second connection (22) respectively have a projection onto a top plane. The projection of the first connection (21) partially overlaps the projection of the second connection (22). The first connection (21) has multiple holes (23) defined therein and selectively corresponding to the multiple holes (111) of the first end of the rotatable section (11) for screwing the first connection (21) to the first end of the rotatable section (11). The second connection (22) has multiple holes (23) defined therein and selectively corresponding to the multiple holes (111) of the second end of the rotatable section (11) for screwing second connection (22) to the second end of the rotatable section (11). The first connection (21) of each fan blade (2) is mounted with the first end of the rotatable section (11) and the second connection (22) of each fan blade (2) is mounted with the second end of the rotatable section (11).

Each fan blade (2) inclines to a specific angle relative to the first connection (21) and the second connection (22) for causing air mass to be downwardly driven when the set of fan blades (2) is rotatably driven by the rotatable section (11). Each fan blade (2) is stably screwed on the first end and the second end of the rotatable section (11) for firmly connecting to the rotatable section (11) of the driving device (1). The first connection (21) and the second connection (22) are cooperatively taken air friction and decrease a vibration caused by air resistance.

Figure 4:
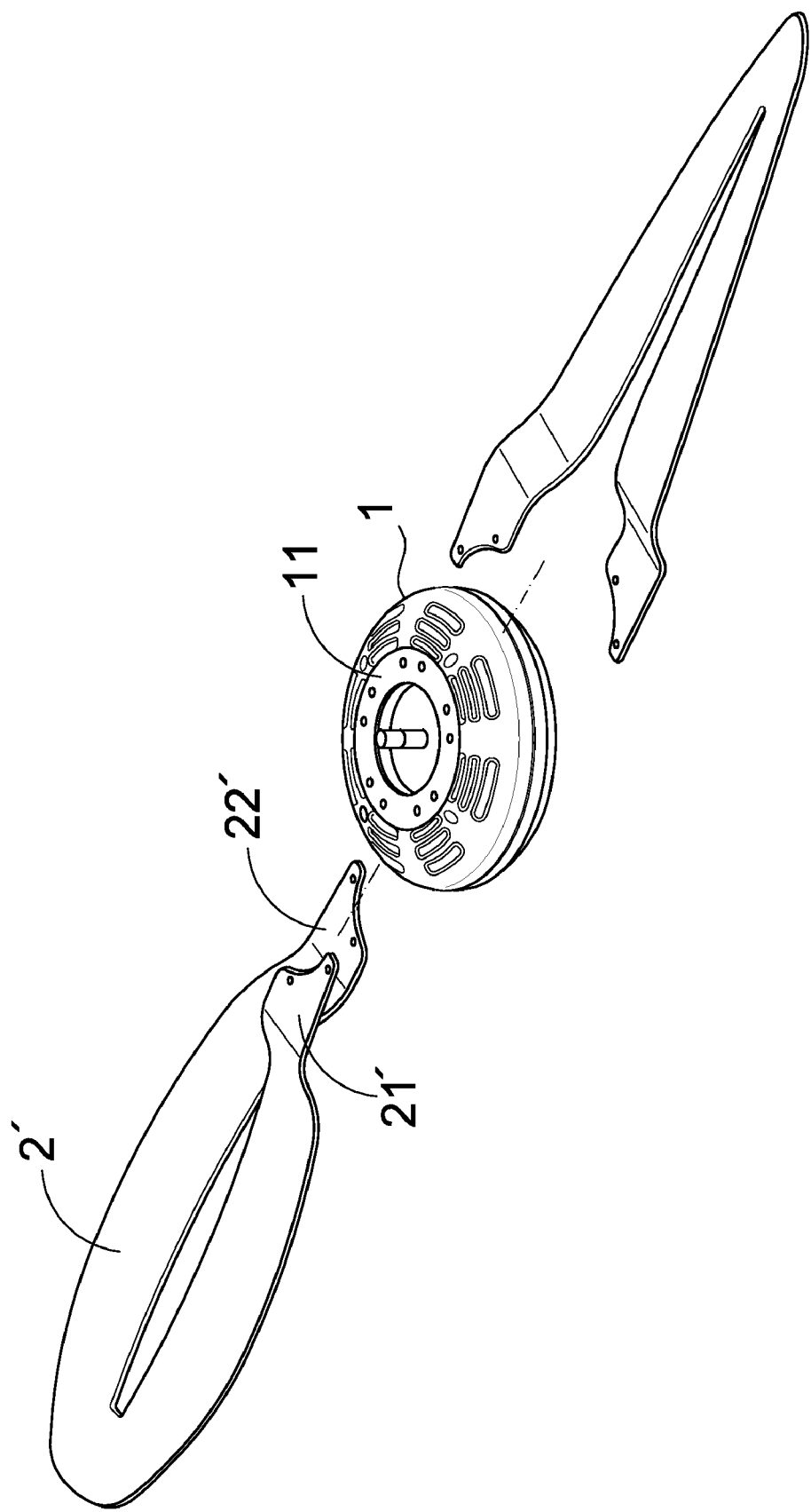
FIG. 4 is an exploded perspective view of a second embodiment of the cooling fan structure in accordance with the present invention.
Figure 5:
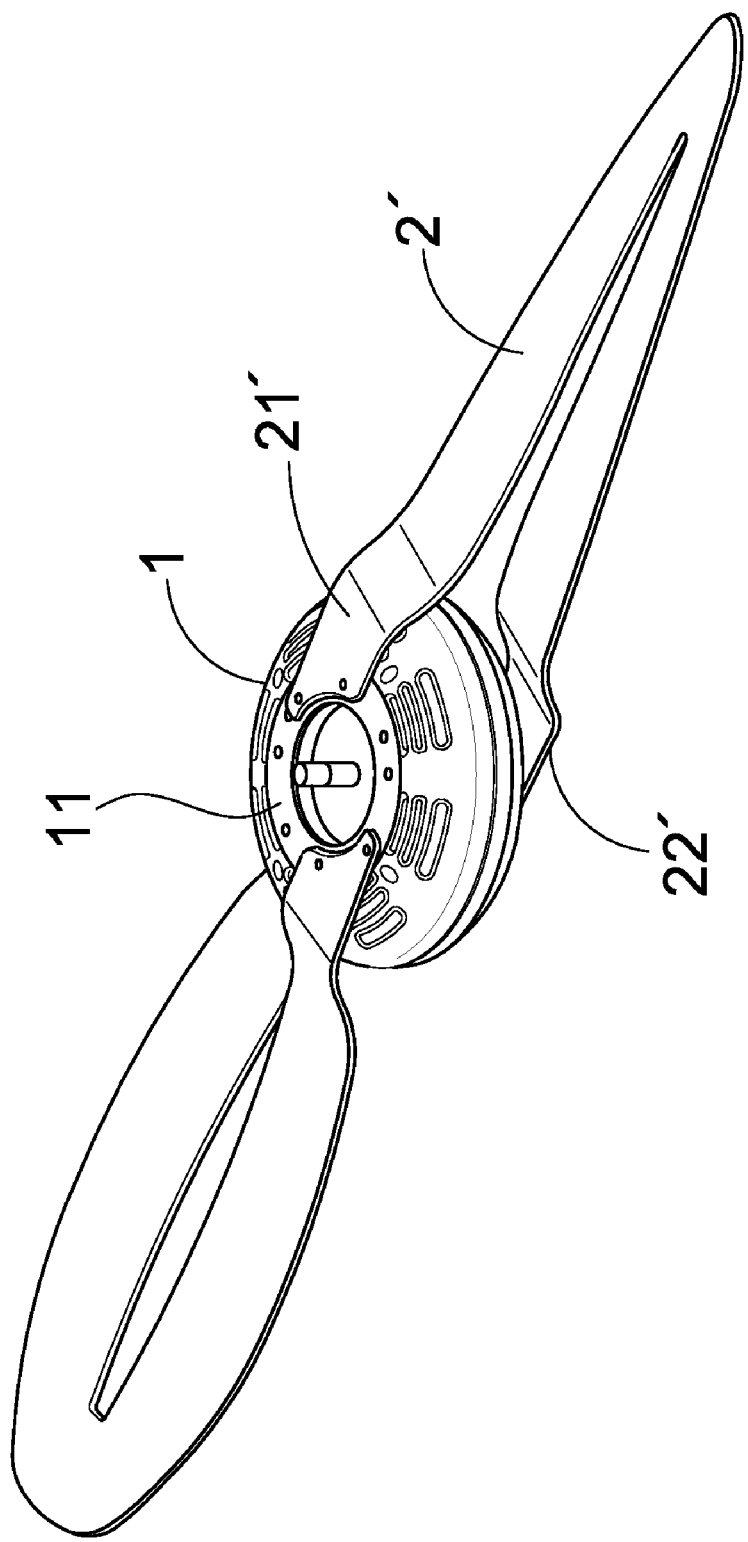
FIG. 5 is an assembled perspective view of the second embodiment of the cooling fan structure in accordance with the present invention.
Figure 6:
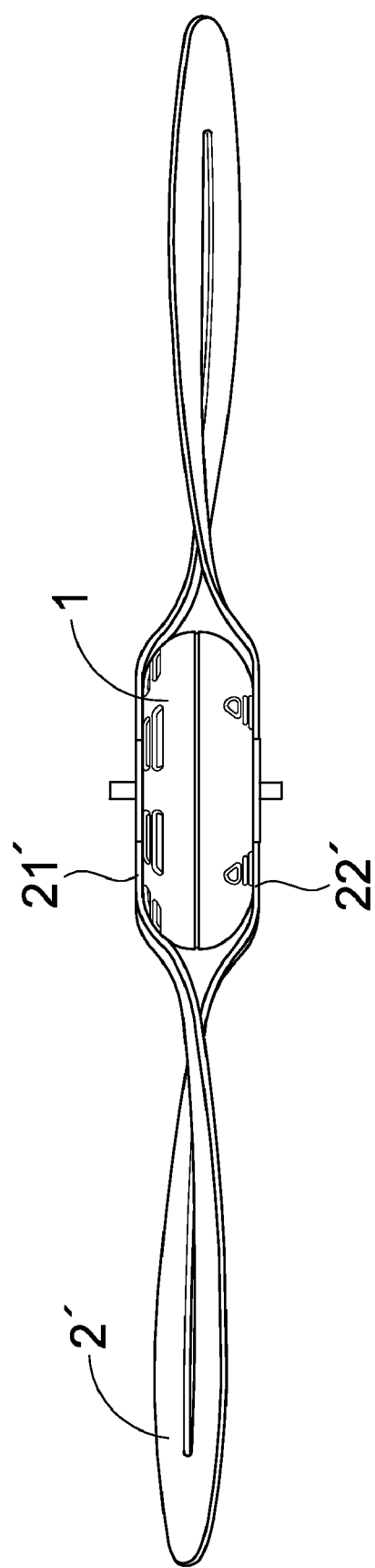
FIG. 6 is a side plan view in FIG. 5.

With reference to FIGS. 4-6, a second embodiment of the cooling fan structure in accordance with the present invention is illustrated. The elements and effects of the second embodiment which are the same with the first embodiment are not described, only the differences are described. Each fan blade (2') in accordance with the second embodiment is crotched shaped. Each fan blade (2') has a slot centrally defined therein and extending to an inner end thereof to divide the inner end into a first connection (21') and a second connection (22'). The first connection (21') and the second connection (22') are noncoplanar. The first connection (21') and the second connection (22') respectively have a projection onto a top plane. The projection of the first connection (21') uncrosses the projection of the second connection (22'). The first connection (21') is mounted with the first end of the rotatable section (11) and the second connection (22') is mounted with the second end of the rotatable section (11).

Figure 7:
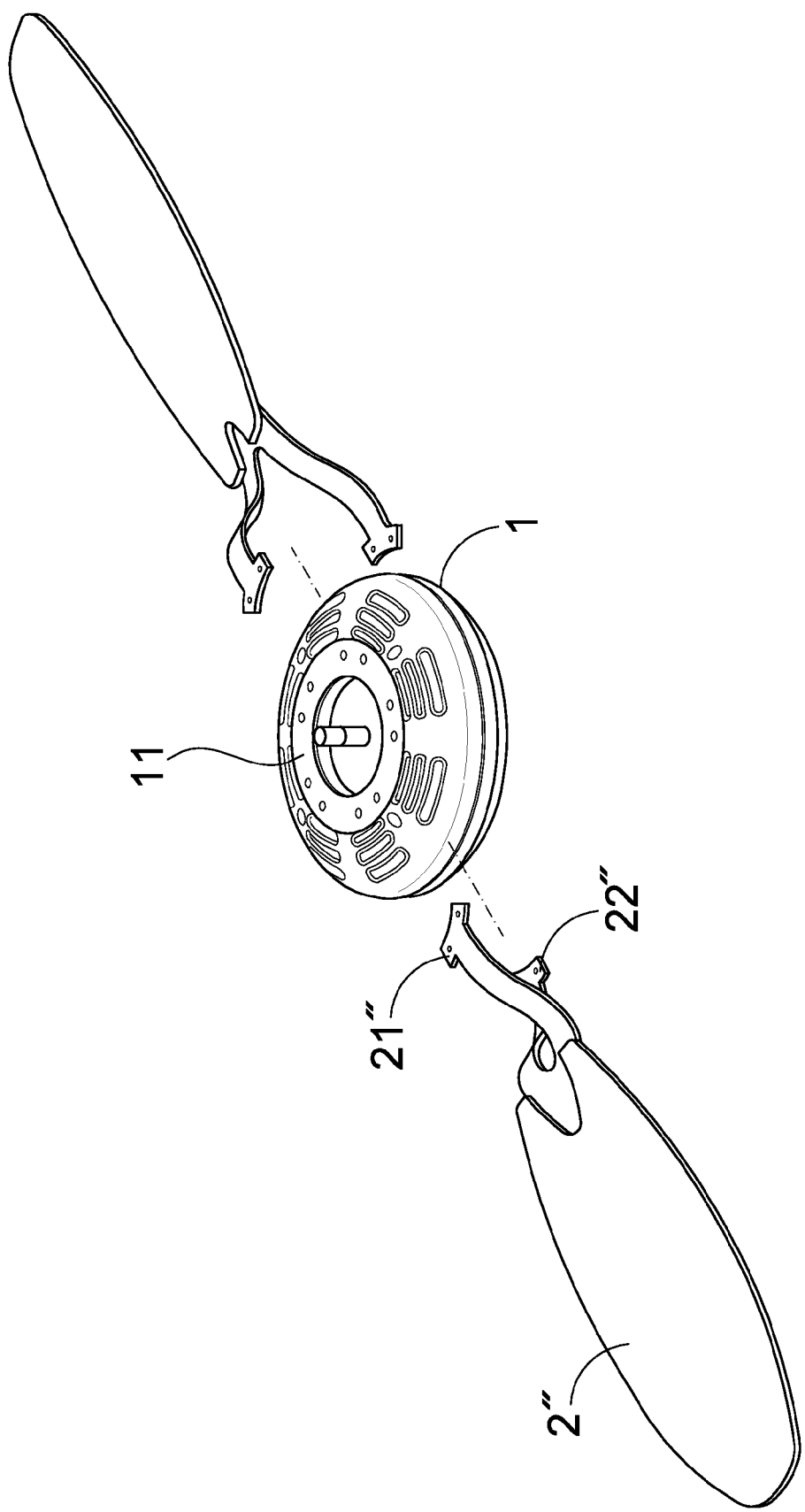
FIG. 7 is an exploded perspective view of a third embodiment of the cooling fan structure in accordance with the present invention.
Figure 8:
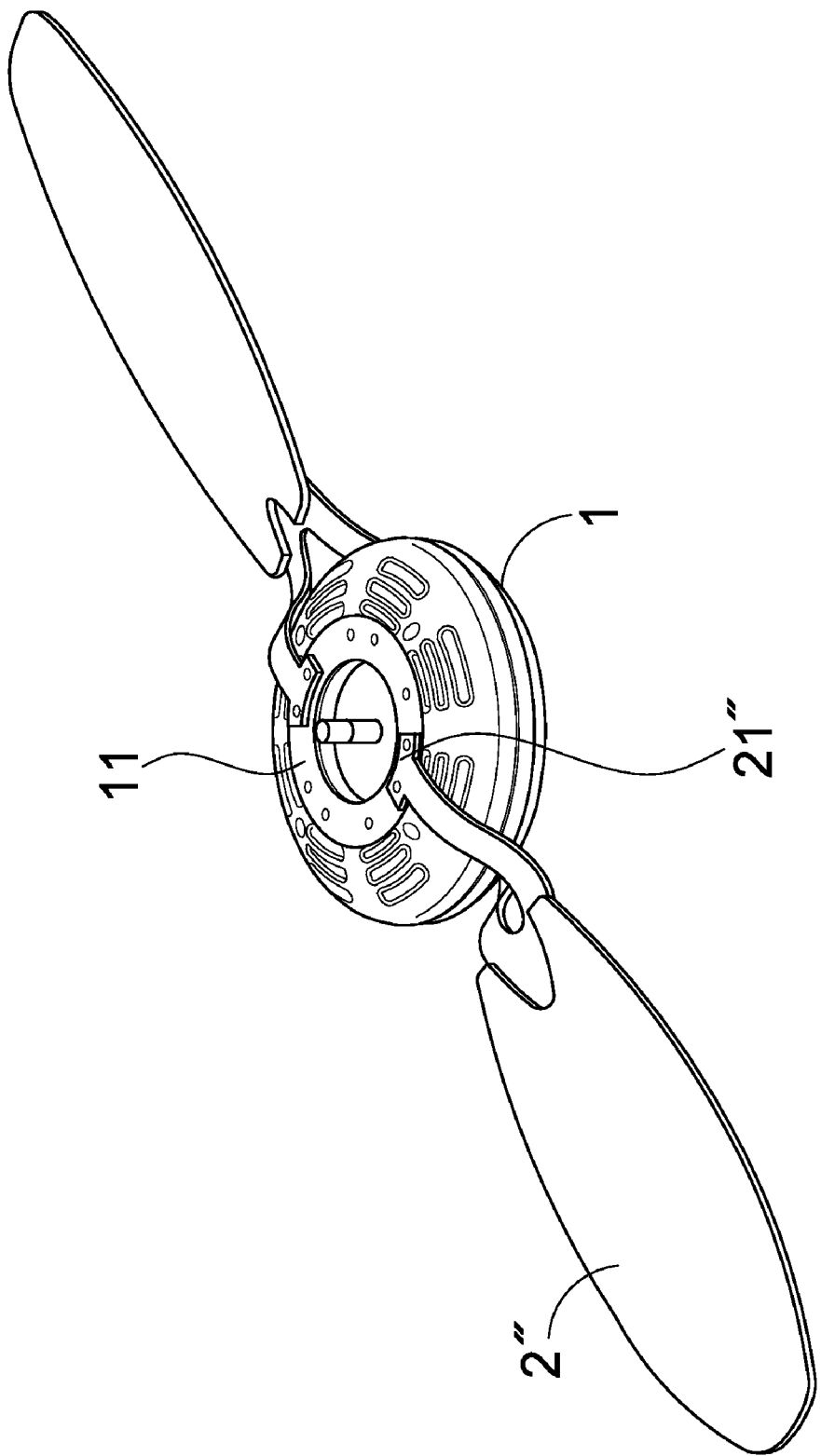
FIG. 8 is an assembled perspective view of the third embodiment of the cooling fan structure in accordance with the present invention.
Figure 9:
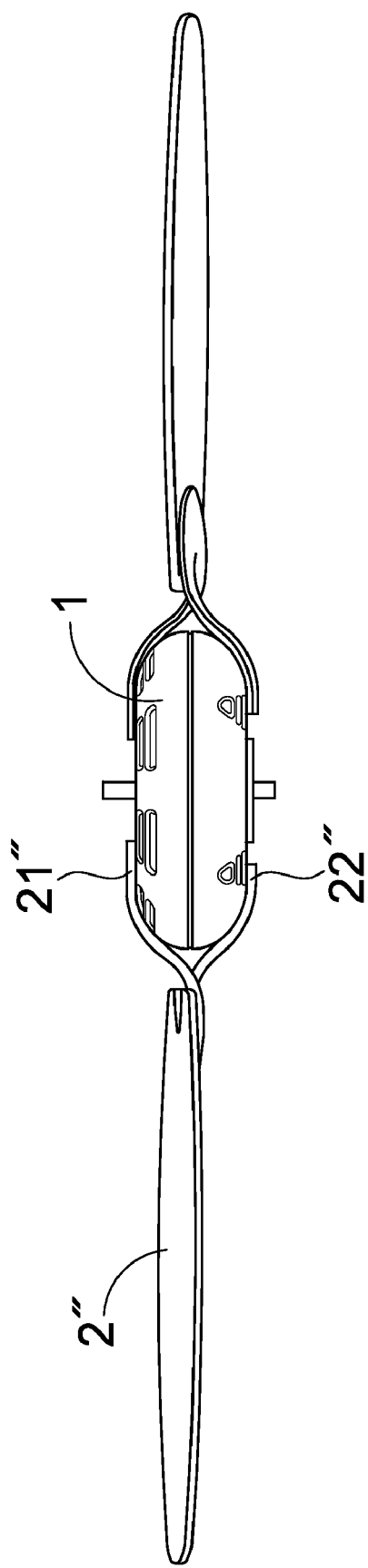
FIG. 9 is a side plan view in FIG. 8.

With reference to FIGS. 7-9, a third embodiment of the cooling fan structure in accordance with the present invention is illustrated. The elements and effects of the third embodiment which are the same with the first embodiment are not described, only the differences are described. Each fan blade (2") in accordance with third embodiment is paddle shaped. Each fan blade (2") has an inner end having a first connection (21") and a second connection (22") respectively extending therefrom. The first connection (21") and the second connection (22") are noncoplanar. The first connection (21") and the second connection (22") respectively have a projection onto a top plane. The projection of the first connection (21") uncrosses the projection of the second connection (22"). The first connection (21") is mounted with the first end of the rotatable section (11) and the second connection (22") is mounted with the second end of the rotatable section (11).

Although the invention has been explained in relation to its preferred embodiment, it is to be understood that many other possible modifications and variations can be made without departing from the spirit and scope of the invention as hereinafter claimed.

What is claimed is:

1. A cooling fan structure comprising:
a driving device having a rotatable section disposed therein for providing a rotatable effect, the rotatable section having a first end longitudinally extending to a top of the driving device and a second end longitudinally extending to a bottom of the driving device;
a set of fan blades radially mounted to the rotatable section of the driving device and driven by the rotatable section, each fan blade having an inner end, the inner end having a first connection and a second connection respectively extending therefrom, the first connection of each fan blade connected to the first end of the rotatable section, the second connection of each fan blade connected to the second end of the rotatable section, each fan blade being crotched shaped.

2. The cooling fan structure as claimed in claim 1, wherein the first connection and the second connection are noncoplanar, the first connection having a projection onto a top plane of the first connection and the second connection having a projection onto a top plane of the second connection, the projection of the first connection partially overlapping the projection of the second connection.

3. The cooling fan structure as claimed in claim 1, wherein the first connection and the second connection are noncoplanar, the first connection having a projection onto the top plane of the first connection and the second connection having a projection onto the top plane of the second connection, the projection of the first connection not overlapping the projection of the second connection.

4. The cooling fan structure as claimed in claim 1, wherein the first end and the second end of the rotatable section respectively have multiple holes defined therein.

* * * * *